N. JOHNSON.
Butter Worker.
No. 41,223.
Patented Jan. 12, 1864.
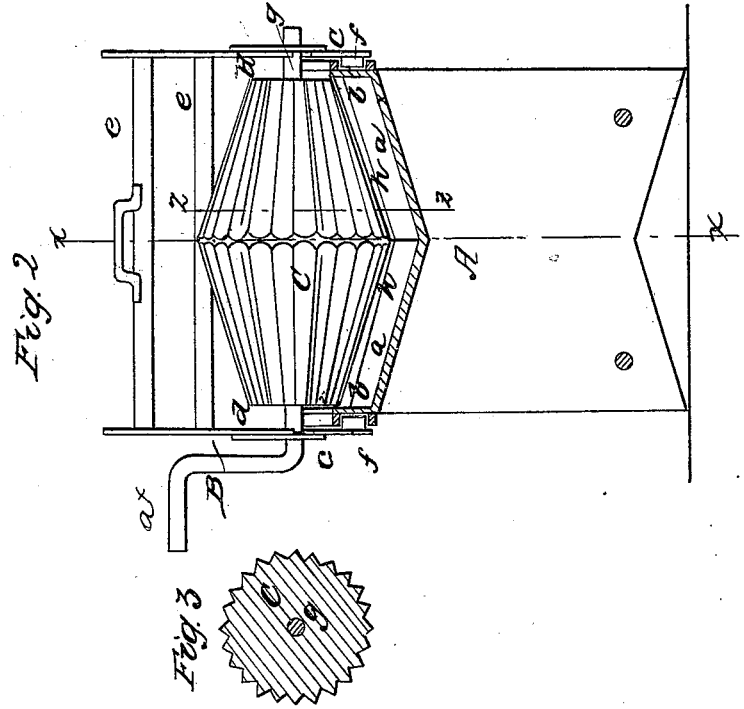
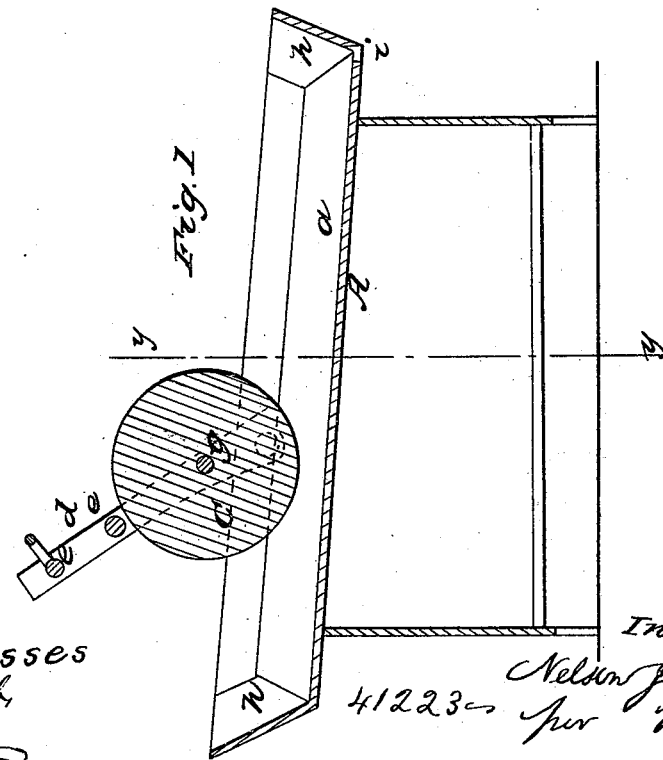

UNITED STATES PATENT OFFICE.

NELSON JOHNSON, OF GUILFORD, NEW YORK.

IMPROVEMENT IN BUTTER-WORKERS.

Specification forming part of Letters Patent No. 41,223, dated January 12, 1864.

*To all whom it may concern:*

Be it known that I, NELSON JOHNSON, of Guilford, in the county of Chenango and State of New York, have invented a new and Improved Butter-Worker; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a transverse vertical section of the same, taken in the line $y\ y$, Fig. 1; Fig. 3, a detached transverse section of the roller, taken on the line $z\ z$, Fig. 2.

Similar letters of reference indicate corresponding parts in the several figures.

This invention consists in the employment or use of an inclined tray provided with a concave bottom formed of two inclined planes, in connection with a roller of biconical form, fluted longitudinally, and fitted in a traveling or sliding frame, all being arranged in such a manner that the butter may be worked very expeditiously and in a thorough manner, the roller-frame being controlled or guided at one end by two rollers, and the opposite end controlled by the hand of the operator, so that the butter may be subjected to more or less pressure, as required.

To enable those skilled in the art to fully understand and construct my invention, I will proceed to describe it.

A represents an inclined tray, the bottom of which is formed of two transversely-inclined planes, $a\ a$, meeting at the center of the tray, so as to form a trough or gutter for the free escape of the water and buttermilk. This tray is supported at a suitable height by any proper framing, and the two sides $b\ b$ of the tray are grooved longitudinally at their outer surfaces, as shown at $c\ c$ in Fig. 2.

B represents a frame, which is composed of two parallel bars, $d\ d$, connected by cross-rods $e$. These bars $d$ have each a roller, $f$, attached to the inner sides of their front parts, and said rollers are fitted and work in grooves $c\ c$, which serve as guides for the frame B as it is drawn back and forth on the tray, while the outer end is controlled by the hand of the operator.

Through the front parts of the bars $d\ d$ a shaft, $g$, passes loosely, and on this shaft, between the bars $d\ d$, a biconical roller, C, is fitted, the roller being of such a form as to correspond in pitch to the inclination of the two inclined planes $a\ a$ of the bottom of the tray, as will be understood by referring to Fig. 2. This is fluted longitudinally, as shown in Fig. 2.

The ends $h$ of the tray A are formed of two oblique parts, so that the roller C may be brought in close contact with them.

The operation is as follows: The butter to be operated upon is placed in the tray A, and the frame B is grasped by the hand of the operator and moved back and forth, so that the roller C will pass from one end of the tray to the other and act upon the butter. The tendency of the roller is to spread out the butter over the inclined planes $a\ a$ and force the water through the same, so as to thoroughly wash out the buttermilk, the water and butter-milk passing down the trough or gutter formed by the bottom of the tray, and escaping through a hole, $i$, made in the lower or depressed end of the same.

By this arrangement the butter is acted upon in the most efficient manner, the mass of butter is not divided or spread apart under the action of the roller, and the water and buttermilk have a free escape from the tray, so that they cannot be forced through and through the mass of butter, but the water will be brought in close contact with and forced directly out of the butter, thereby washing out the buttermilk at once, while the butter may be subjected to a greater or less pressure by pressing downward more or less hard on the outer end of the roller-frame.

I am aware that revolving rollers of various forms have been used in connection with trays for the purpose of working butter; but I am not aware that any have been constructed of the form herein shown and described, to admit of the flow of the water and buttermilk to a single discharge gutter or trough.

I would remark that the roller C may be fluted by means of V-shaped grooves, or may have V-shaped and semicircular grooves alternately arranged on its periphery, and that the roller may be rotated by a crank, $a^x$, at one end of shaft $g$, if desired. I do not, however, consider the crank of much value.

I do not claim, broadly, an inclined tray and roller irrespective of the construction herein shown and described; but,

Having thus described my invention, what I do claim as new, and desire to secure by Letters Patent, is—

The biconical fluted roller C, placed within a traveling or sliding frame, B, attached to or connected with the tray A, as shown, in combination with the concave bottom of the tray, formed of two longitudinal inclined planes, $a$, parallel with the two conical surfaces of the roller, substantially as and for the purpose herein set forth.

NELSON JOHNSON.

Witnesses:
THOMAS DICKINSON,
WM. H. PLATT.